UNITED STATES PATENT OFFICE.

GUSTAV PUM, OF GRATZ, AND ARTHUR GLAESSNER, OF VIENNA, AUSTRIA-HUNGARY, ASSIGNORS TO PHILIPP RÖDER-BRUNO RAABE A. G., OF VIENNA, AUSTRIA-HUNGARY, A JOINT-STOCK COMPANY.

PROCESS OF MANUFACTURING ARTIFICIAL SPONGE.

1,142,619.      Specification of Letters Patent.      Patented June 8, 1915.

No Drawing.      Application filed October 16, 1913. Serial No. 795,550.

*To all whom it may concern:*

Be it known that we, Dr. GUSTAV PUM, a subject of the Emperor of Austria-Hungary, and resident of Gratz, Styria, Empire of Austria-Hungary, and Dr. ARTHUR GLAESSNER, a subject of the Emperor of Austria-Hungary, and resident of Vienna, Empire of Austria-Hungary, have invented certain new and useful Improvements in the Process of Manufacturing Artificial Sponge, of which the following is a full, clear, and exact description, such as will enable others skilled in the art to make and use the same.

This invention relates to a process of manufacturing artificial sponge or substitute for natural sponge such as artificial or substitute sponge showing almost all properties of natural sponge. The present process is very simple and comparatively cheap.

According to this invention a concentrated solution of a cellulose derivative is intimately mixed with fibers and a suitably comminuted substance or substances capable of being liquefied, whereby a pasty mass is obtained. This mass is then brought to the desired shape and then the comminuted substance is liquefied and separated from the rest of the mass while the cellulose derivative is hardened or coagulated.

Owing to the liquefying and removal of the comminuted substance pores are formed in the cellulose derivative which being hardened or coagulated incloses and holds together the fibers, while the latter greatly increase the mechanical strength of the hardened or coagulated cellulose derivative. Thus a porous spongy body is obtained having not only the aspect but also most of the valuable properties of natural sponge, more particularly a high degree of porosity and great mechanical strength.

For carrying into effect this process a concentrated solution of nitro cellulose or acetyl cellulose in amylic acetate, acetone or other suitable solvent or a concentrated solution of viscose in caustic soda lye or a concentrated solution of another, suitable cellulose derivative is prepared. To this concentrated solution a suitable quantity of vegetable or animal fiber or both and a more or less finely comminuted substance is added which is insoluble in the cellulose derivative solution but is capable of being liquefied, either by the application of heat, such as paraffin, stearin, salts, rich in crystal water and the like, or by means of a suitable solvent such as sugar, salts and the like, water, dilute acids or solutions of salts being used as solvent. When substances liquefiable by the application of heat are used such as paraffin, or salts rich in crystal water, the intimate mixture of the concentrated cellulose derivative solution, fiber and the suitably comminuted liquefiable substance is brought to the desired shape and heated until the said substance is liquefied and oozes out of the mass whereby pores are formed in the latter. In some cases the cellulose derivative solution is hardened or coagulated by such heating owing to its solvent being evaporated in the course of such heating or by the direct action of heat or as in the case of salts rich in crystal water, by the action of salt solution formed in liquefying the substance. For completely hardening the cellulose derivative after the removal of the liquefiable substance the mass may if necessary be immersed in some coagulating or hardening agent such as a dilute acid or salt solution.

When substances liquefiable by means of a solvent are used such as sugar, salts or the like, the mixture prepared as above described and brought to the desired shape is immersed in a solvent of such liquefiable substance such as water dilute acid or salt solution until the liquefiable substance is dissolved and removed from the mass. In this case the liquefiable substance and its solvent are preferably so selected that they act as hardening or coagulating agents on the cellulose derivative solution. Or the cellulose derivative solution may be hardened or coagulated after the removal of the liquefiable substance by the action of heat or by immersion into a separate coagulating or hardening bath.

The following is an example of carrying into effect the improved process. 20 grams of cotton are intimately mixed with 280 grams of concentrated viscose solution (containing 20 grams of viscose 400 grams of finely powdered common salt and 400 grams of coarsely granulated common salt whereby a paste is obtained which is brought to the desired shape and is then immersed into 10% acetic acid until the paste is completely permeated. The common salt is dissolved and removed from the viscose which is at the same time hardened and coagulated so as to inclose and firmly hold together the cotton fibers. Of course instead of cotton other fibrous material, instead of viscose another cellulose derivative and instead of common salt other liquefiable substances and instead of acetic acid other acids or salt solutions may be used.

We are aware that it has been proposed to manufacture sponge substitutes or artificial sponge from india rubber, gutta percha and balata by vulcanizing the same under high pressure of a gas or after incorporating into the same substances such as water or ammonium carbonate giving off vapors or gases at the vulcanizing temperature. We are also aware that it has been proposed to incorporate into the rubber, gutta percha and balata, certain vegetable or animal fibers or strips of leather, and that it has been proposed to manufacture sponge substitutes by converting cellulose into a plastic mass by the action of suitable reagents such as chlorid of zinc or aluminium, or acids, and mixing the same by grinding with anhydrous haloid compounds of alkalis whereupon the plastic mass thus obtained is provided with pores by driving pins through the same, and which is then thoroughly washed, and finally we are also aware that it has been proposed to use acetic acid with or without the addition of salts as a setting agent for viscose, but we do not claim broadly any of these known processes or features.

Claims:

1. A process for manufacturing artificial sponge from viscose with an admixture of fibers consisting in mixing the viscose with a granular liquefiable solid substance whereby a paste is obtained, and then liquefying said substance and removing it from the mass and hardening the viscose.

2. A process for manufacturing artificial sponge from viscose with a granular soluble solid substance whereby a paste is obtained, then shaping the paste into pieces of desired form, then immersing the shaped pieces of the mass into a solvent for said soluble substance, whereby said substance is dissolved and removed from the mass, and hardening the viscose.

3. A process for manufacturing artificial sponge from viscose with an admixture of fibers consisting in mixing said viscose with a granular soluble solid substance, a solution of which substance will harden the viscose, whereby a paste is obtained, then shaping the paste into pieces of the desired form, and then immersing the shaped pieces of the mass in a solvent for said soluble substance whereby said substance is dissolved and removed from the mass and the viscose is hardened.

In testimony whereof we have signed our names to this specification, in the presence of two subscribing witnesses.

Dr. GUSTAV PUM.
Dr. ARTHUR GLAESSNER.

Witnesses:
ARTHUR GAUMANN,
AUGUST FUGGER.